Oct. 16, 1928.

A. R. BRUCE ET AL 1,688,262

BELT CLAMP

Filed Sept. 8, 1927

Alonzo Robertson Bruce
Ed T. Thornton
INVENTORS

BY Victor J. Evans
ATTORNEY

WITNESS:

Patented Oct. 16, 1928.

1,688,262

UNITED STATES PATENT OFFICE.

ALONZO ROBERTSON BRUCE, OF MEXIA, AND ED T. THORNTON, OF WORTHAM, TEXAS.

BELT CLAMP.

Application filed September 8, 1927. Serial No. 218,332.

This invention relates to means for clamping the ends of a belt together, the general object of the invention being to provide a body having a socket for receiving the ends of a belt, with means for clamping the ends in the socket in such a manner that the belt ends are not pierced or weakened in any manner.

Another object of the invention is to so form the device that the clamping action is exerted over the entire portions of the ends so that there is no danger of the ends being pulled from the fastener.

This invention also consists in certain other features of construction and in the combination and arrangemet of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which.

Figure 1:
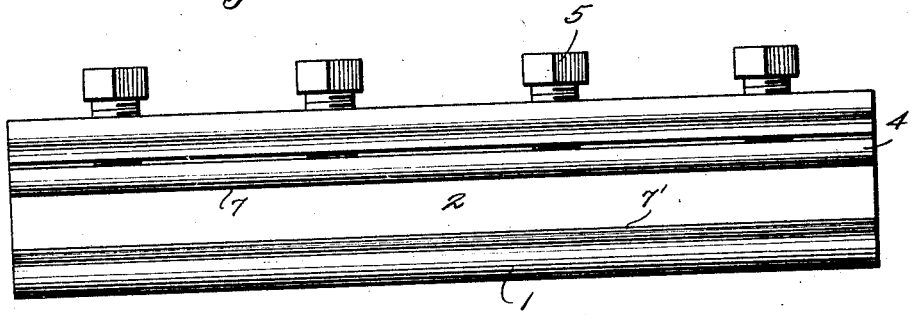
Figure 1 is a front elevation of the improved clamp.
Figure 2:
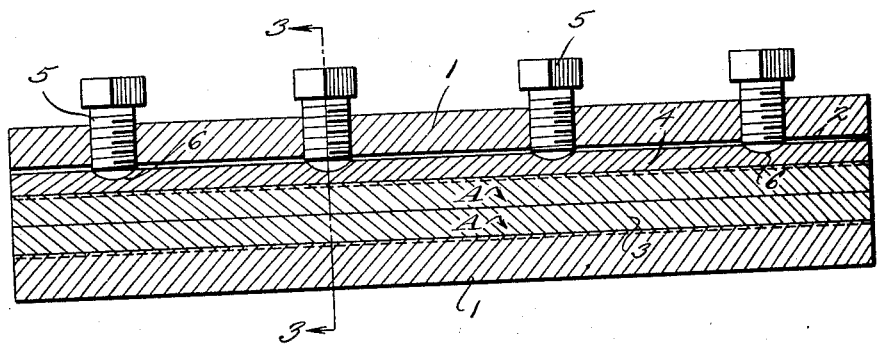
Figure 2 is a section on line 2—2 of Figure 3.
Figure 3:
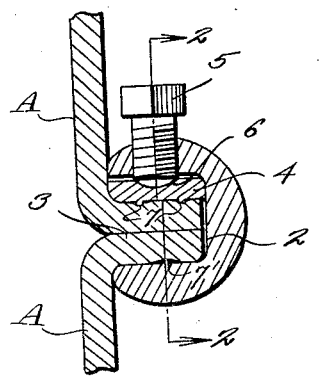
Figure 3 is a section on line 3—3 of Figure 2.

In these views, 1 indicates a body which is of a length equal to the width of the belt and which is provided with a socket 2 to receive the ends 3 of the belt A, after said ends are bent at right angles and placed together, as clearly shown in Figure 3. A plate 4 is placed in the socket, this plate being of the same length as the body and bolts 5 are placed in threaded holes formed in the body, the holes being spaced equi-distances apart and communicating with the socket so that the bolts will engage the plate 4. The plate is provided with recesses 6 to receive the rounded ends of the bolts, as shown in Figures 2 and 3. Thus by tightening the bolts, the plate will set up a clamping action between itself and one wall of the socket and thereby clamp the ends of the belt in the socket.

Longitudinally extending ribs 7 are formed on the plate and a rib 7' is formed on the side wall of the socket, against which an end of the belt bears, these ribs biting into the belt ends and preventing them from being pulled out of the socket.

The drawings show the body 1 as of circular form and the ribs of rectangular formation, but it will, of course, be understood that other forms can be given to the body and ribs and it will also be understood that any desired number of ribs can be used on both the plate and the inner wall of the body.

From the foregoing it will be seen that we have provided a simple form of belt fastener which can be manufactured to sell at low cost and one which will firmly hold the ends of the belt together without cutting or otherwise damaging the end parts of the belt. The device can be easily and quickly attached to the belt ends and just as easily and quickly removed therefrom. It is preferable to place the ribs 7' out of alignment with the ribs on the plate, as shown in Figure 3 and to have the privilege of forming the body and plate 4 so that the face of the clamp which is presented to the pulley or wheel over which the belt passes may be curved to fit the crown of the pulley or wheel, or if desired, this face may be made straight.

Attention is called to the fact that by having the clamp engaging the bent-over ends of the belt, the clamp is prevented from contacting with the pulleys or wheels over which the belt passes and that it is unnecessary to punch holes in the belt ends so that the belt is not weakened in any way.

It is thought from the foregoing description that the advantages and novel features of our invention will be readily apparent.

It is to be understood that we may make changes in the construction and in the combination and arrangement of the several parts, provided that such changes fall within the scope of the appended claim.

What we claim is:—

A belt fastener comprising a body of substantially circular shape in cross section and having a rectangular socket therein which opens out through one face of the body, said body also having threaded holes therein, the inner ends of which communicate with the socket, bolts threaded in said hole, a plate in the socket having recesses therein for receiving the ends of the bolts, a pair of longitudinally extending ribs on the outer face of said plate for engaging a belt end placed in the socket and a longitudinally extending rib on that wall of the socket which is opposite the wall through which the bolts pass and against which the other belt end bears, the rib on the wall being centrally arranged with respect to the ribs on the plate.

In testimony whereof we affix our signatures.

ALONZO ROBERTSON BRUCE.
ED T. THORNTON.